US012741616B2

(12) United States Patent
Chen

(10) Patent No.: US 12,741,616 B2
(45) Date of Patent: Sep. 22, 2026

(54) BATTERY SWAP DEVICE AND BATTERY SWAP SYSTEM

(71) Applicant: CONTEMPORARY AMPEREX TECHNOLOGY (HONG KONG) LIMITED, Hong Kong (CN)

(72) Inventor: Weifeng Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 361 days.

(21) Appl. No.: 18/467,385

(22) Filed: Sep. 14, 2023

(65) Prior Publication Data

US 2023/0415708 A1 Dec. 28, 2023

Related U.S. Application Data

(63) Continuation of application No. PCT/CN2022/089981, filed on Apr. 28, 2022.

(30) Foreign Application Priority Data

Sep. 30, 2021 (CN) ......................... 202111166643.X

(51) Int. Cl.
*B60S 5/06* (2019.01)
*B60L 53/80* (2019.01)

(52) U.S. Cl.
CPC ................. *B60S 5/06* (2013.01); *B60L 53/80* (2019.02)

(58) Field of Classification Search
CPC .......... B60S 5/06; B60L 53/80; B60L 3/0046; H02J 7/0045; H02J 7/0042; Y02T 10/70; Y02T 10/7072
See application file for complete search history.

(56) References Cited

U.S. PATENT DOCUMENTS 4,120,411 A * 10/1978 Johnson .................... B62B 3/10
104/235
4,808,058 A * 2/1989 Carney .................... B60K 1/04
414/349

(Continued)

FOREIGN PATENT DOCUMENTS

CN 207070478 U 3/2018
CN 108116378 A 6/2018

(Continued)

OTHER PUBLICATIONS

The World Intellectual Property Organization (WIPO) International Search Report and written opinion for PCT/CN2022/089981 Jul. 18, 2022 13 pages (including English translation).

(Continued)

*Primary Examiner* — James M Dolak

(74) *Attorney, Agent, or Firm* — ANOVA LAW GROUP, PLLC

(57) ABSTRACT

A battery swap device includes a movable base configured to carry a battery that is provided with a connector configured to transfer electric energy, and a protective apparatus provided on the movable base, configured to protect the connector, and including a drive mechanism and a covering member. The drive mechanism is configured to drive the covering member to move to cover or uncover the connector.

11 Claims, 9 Drawing Sheets

(56) References Cited

U.S. PATENT DOCUMENTS

| | | | | |
|---|---|---|---|---|
| 5,360,307 | A * | 11/1994 | Schemm | B62B 3/10 180/68.5 |
| 5,425,159 | A * | 6/1995 | Kluttermann | D01H 9/185 104/34 |
| 5,760,569 | A * | 6/1998 | Chase, Jr. | H01M 50/204 414/281 |
| 6,896,468 | B2 * | 5/2005 | Gallea | A47L 11/4005 15/49.1 |
| 6,938,553 | B2 * | 9/2005 | Tamaki | H01M 50/50 180/68.5 |
| 8,858,152 | B1 * | 10/2014 | McDaniel | B60L 50/64 414/398 |
| 9,227,601 | B2 * | 1/2016 | Corfitsen | B60L 50/66 |
| 9,358,895 | B2 * | 6/2016 | Avganim | B60K 1/04 |
| 9,827,865 | B2 * | 11/2017 | Zhou | H01M 50/251 |
| 9,850,114 | B2 * | 12/2017 | Gilland | B66F 9/0754 |
| 10,183,563 | B2 * | 1/2019 | Rayner | B62K 27/06 |
| 10,214,113 | B2 * | 2/2019 | Qi | H01R 13/6683 |
| 10,819,126 | B2 * | 10/2020 | Hognaland | H02J 7/0045 |
| 11,059,382 | B2 * | 7/2021 | Han | H01M 50/249 |
| 11,088,555 | B2 * | 8/2021 | Liu | B60L 53/30 |
| 11,245,273 | B2 * | 2/2022 | Jyoti | H01M 50/278 |
| 11,299,024 | B2 * | 4/2022 | Linde | B64C 31/024 |
| 11,623,541 | B2 * | 4/2023 | Zhang | H02J 7/0045 320/104 |
| 12,030,402 | B2 * | 7/2024 | Boyce | H01M 50/244 |
| 12,466,285 | B2 * | 11/2025 | Pinkard | B60L 53/80 |
| 12,552,284 | B2 * | 2/2026 | Guetta | B60L 53/80 |
| 2010/0292877 | A1 * | 11/2010 | Lee | B60L 50/66 180/68.5 |
| 2013/0104361 | A1 | 5/2013 | Corfitsen | |
| 2014/0020170 | A1 | 1/2014 | Timischl | |
| 2018/0186243 | A1 | 7/2018 | Qi et al. | |
| 2019/0393627 | A1 | 12/2019 | Etsunagi et al. | |

FOREIGN PATENT DOCUMENTS

| | | | |
|---|---|---|---|
| CN | 208093627 | U | 11/2018 |
| CN | 210554713 | U | 5/2020 |
| CN | 112259874 | A | 1/2021 |
| CN | 112821500 | A | 5/2021 |
| CN | 213242751 | U | 5/2021 |
| CN | 213243581 | U | 5/2021 |
| DE | 102017005555 | A1 | 1/2018 |
| JP | 2012006591 | A | 1/2012 |
| JP | 2013139207 | A | 7/2013 |
| JP | 2019221135 | A | 12/2019 |
| JP | 2023550316 | A | 12/2023 |
| KR | 20190132663 | A | 11/2019 |
| WO | 2018068559 | A1 | 4/2018 |

OTHER PUBLICATIONS

State Intellectual Property Office of China The First Office Action for Application No. 202111166643.X Aug. 12, 2025 13 pages (including translation).

The Korean Intellectual Property Office Request for the Submission of an Opinion for Application No. 10-2023-7022886 Aug. 5, 2025 12 Pages (including translation).

The European Patent Office (EPO) The Extended European Search Report for Application No. 22874195.5 Jul. 19, 2024 6 Pages.

The Japan Patent Office (JPO) Decision to Grant a Patent for Application No. 2023-541131 Aug. 6, 2024 5 Pages (including translation).

Korean Intellectual Property Office (KIPO) Patent Rejection Decision for Application No. 10-2023-7022886 Apr. 28, 2026 9 Pages (including translation).

State Intellectual Property Office of China Notice of Grant of Invention Patent Right for Application No. 202111166643.X May 18, 2026 7 pages (including translation).

* cited by examiner 200
210
220
1000
100
2000
2001
220
210
200

A
200
210
220
1000
100
2000
2001
220
200
210
A 2123
131
β
140
130
α
220
2121
2122

BATTERY SWAP DEVICE AND BATTERY SWAP SYSTEM

CROSS-REFERENCE TO RELATED APPLICATIONS

The present application is a continuation of International Application No. PCT/CN2022/089981, filed on Apr. 28, 2022, which claims priority to Chinese patent application no. 202111166643.X, entitled "BATTERY SWAP DEVICE AND BATTERY SWAP SYSTEM" and filed on Sep. 30, 2021, which are incorporated herein by reference in their entirety.

TECHNICAL FIELD

The present application relates to the technical field of battery swapping for power consuming devices, and in particular to a battery swap device and a battery swap system.

BACKGROUND ART

With the development of new energy technology, there are more and more devices using a battery. When the electric energy is exhausted, a power consuming device is always connected to a charging device for replenishment with electric energy. In addition, there is also a way to quickly replenish electric energy by means of replacing a battery, so that a special battery swap device is usually required to replace the battery.

The battery swap device removes an under-charge battery (i.e., a battery to be charged) from a power consuming device, transfers the under-charge battery to a charging device for replenishment with electric energy, and transfers a full-charge battery (i.e., a fully charged battery) to the power consuming device for installation. During the transfer process, the battery is exposed and thus easily damaged, thereby reducing the safety of the battery. battery

SUMMARY

The present application aims to provide a battery swap device and a battery swap system, so as to solve the problem in the related art.

The embodiments of the present application are implemented as below.

In a first aspect, according to an embodiment of the present application, a battery swap device is provided, comprising:

a movable base configured to carry a battery that is provided with a connector configured to transfer electric energy; and a protective apparatus provided on the movable base, configured to protect the connector, and comprising a drive mechanism and a covering member, the drive mechanism being configured to drive the covering member to move to cover or uncover the connector.

In the technical solution of the present application, the protective apparatus is provided on the movable base. During the transfer process of the battery by the movable base, the drive mechanism of the protective apparatus drives the covering member to cover the connector of the battery, and the covering member protects the connector to prevent dust and water from entering the connector. After the battery is transferred in position, the drive mechanism drives the covering member to move away from the connector to enable the battery to leave the movable base. In the battery swap device according to the present application, during the transfer process, the covering member automatically protects the connector of the battery under the action of the drive mechanism, thereby effectively improving the safety of the battery and prolonging the service life of the connector.

In an embodiment of the present application, the protective apparatus has an extended state in which the covering member extends out of the movable base to cover the connector, and a retracted state in which the covering member is retracted to the movable base.

In the above technical solution, the drive mechanism drives the covering member to leave the connector of the battery and drives the covering member to retract to the movable base, so that the whole battery swap device takes up a small space.

In an embodiment of the present application, the movable base has an accommodating space, and in the retracted state, the covering member is at least partially located in the accommodating space.

In the above technical solution, when retracted, the covering member is at least partially located in the accommodating space, with only part of the covering member exposed or not exposed to the outside of the movable base, so that the battery swap device is of a more compact structure, has reduced space occupied by the battery swap device, and also has a function of protecting the covering member to prevent the covering member from being damaged by interference with foreign objects.

In an embodiment of the present application, in the retracted state, the covering member is located on a side surface of the movable base; and in the extended state, the covering member is located above the movable base.

In the above technical solution, the covering member is retracted to the side surface of the movable base and does not occupy the space above the movable base, so that when the battery is placed on the movable base, there is no need to consider avoiding the covering member. Such a configuration will not affect the pick and place of the battery. In addition, when the battery is mounted upwards to a power consuming device by the battery swap device, the covering member on the side surface is less likely to interfere with the power consuming device.

In an embodiment of the present application, one end of the drive mechanism is mounted at the movable base, and the covering member is connected to the other end of the drive mechanism.

In the above technical solution, the covering member is directly connected to the movable base by means of the drive mechanism, so that the connection structure is simple.

In an embodiment of the present application, the drive mechanism comprises a drive member, a first connecting rod and a second connecting rod, one end of the first connecting rod and one end of the second connecting rod being separately hinged to the movable base, the other end of the first connecting rod and the other end of the second connecting rod being separately hinged to the covering member, and the drive member being configured to drive the first connecting rod to rotate around a hinge point of the first connecting rod to the movable base.

In the above technical solution, the movable base, the first connecting rod, the covering member and the second connecting rod are sequentially hinged to form a four-connecting-rod mechanism which guarantees, with a simple structure, smooth movement of the covering member along a set route to ensure that the covering member covers the connector.

In an embodiment of the present application, the drive mechanism further comprises a first rotating shaft, one end of the first connecting rod being hinged to the movable base by means of the first rotating shaft, and the first rotating shaft being fixed to the first connecting rod; and the drive mechanism further comprises a gear and a rack which mesh with each other, the gear being fixed to the first rotating shaft, and the drive member being configured to drive the rack to move so as to swing the first connecting rod by means of the gear.

In the above technical solution, a linear motion is converted into rotation by means of the gear and the rack and then swings the first connecting rod to drive the covering member. The driving can be implemented with an ordinary pneumatic cylinder, electric cylinder, etc., and does not require the use of a high-torque rotary drive device, so as to have low requirements on the drive device.

In an embodiment of the present application, the drive mechanism further comprises a sliding rail and a slider which cooperate with each other, the slider being fixedly connected to the movable base, and the rack being fixedly connected to the sliding rail.

In the above technical solution, the sliding rail and the slider cooperate for guiding the rack to move stably, ensuring the drive effect.

In an embodiment of the present application, the covering member is a cover-shaped member configured to cover over the connector.

In the above technical solution, the cover-shaped structure shields the connector in all directions to achieve comprehensive protection and high safety.

In an embodiment of the present application, the covering member comprises a top plate, an end plate and two side plates, the two side plates being connected to opposite sides of the top plate, the end plate being provided at one end of the top plate and connected to the top plate and the two side plates, and the side of the covering member opposite the top plate and the side of the covering member opposite the end plate being both open.

In the above technical solution, in addition to the opening opposite the top plate, the cover-shaped structure further has an opening opposite the end plate. When the covering member extends out of the movable base to cover the connector, the side opposite the end plate needs to pass over the connector to reach the other side of the connector. Providing the opening on this side can prevent interference between the cover-shaped structure and the connector. Since there is no interference, the movement path of the covering member can be set relatively close to the movable base, so that the protective apparatus requires a relatively small operating space and can thus conveniently operate in a narrow space under a vehicle.

In an embodiment of the present application, the battery swap device further comprises:

a first detection unit configured to output a first signal when the protective apparatus is detected to be in the extended state; and/or a second detection unit configured to output a second signal when the protective apparatus is detected to be in the retracted state.

In the above technical solution, the first detection unit and the second detection unit are provided to obtain state information of the covering member, so as to eliminate abnormality in a timely manner to ensure the safety of the battery during the transfer process.

In a second aspect, according to an embodiment of the present application, a battery swap system is provided, comprising:

a battery swap platform; and a battery pick-and-place device.

With regard to the battery swap device according to the first aspect of the present application, the battery swap device moves between the battery swap platform and the battery pick-and-place device to transfer a battery.

In the battery swap system according to the present application, the connector is protected by the protective apparatus during the movement of the battery swap device, so that the battery is not easily damaged.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
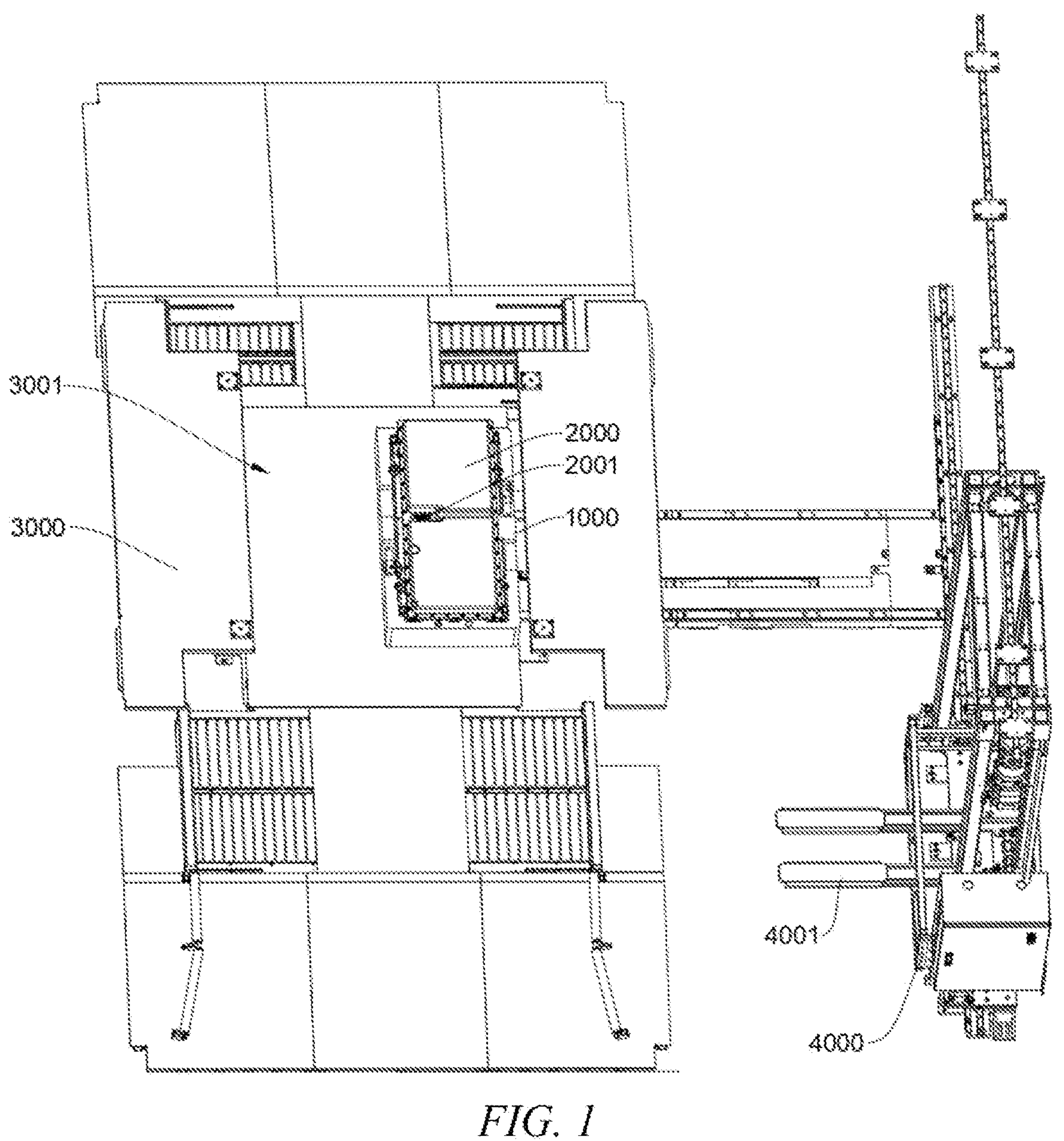
FIG. 1 is a schematic structural diagram of a battery swap system according to an embodiment of the present application.

List of reference signs: 1000—Battery swap device; 2000—Battery; 2001—Connector; 3000—Battery swap platform; 3001—Avoidance opening; 4000—Battery pick-and-place device; 4001—Fork; 100—Movable base; 110—

Base body; 120—Accommodating space; 130—Third connecting rod; 131—Limiting boss; 140—Elastic resetting member; 200—Protective apparatus; 210—Drive member; 211—Connecting member; 2121—First connecting rod; 2122—Second connecting rod; 2123—First rotating shaft; 2131—Rack; 2132—Gear; 2133—Sliding rail; 2134—Slider; 220—Covering member; 221—Top plate; 222—End plate; 223—Side plate; 224—First opening; 225—Second opening; 300—First detection unit; 400—Second detection unit; α—Clockwise direction; β—Counterclockwise direction.

DETAILED DESCRIPTION OF EMBODIMENTS

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "mutual connection", "connection", "fixing", etc. should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

With the development of new energy technology, there are more and more devices using a battery. When the electric energy is exhausted, a power consuming device is always connected to a charging device for replenishment with electric energy. For example, an electric vehicle can be connected to a charging pile for charging. Compared with the method of connection to a charging device, such as a charging pile, for replenishment with electric energy, the battery replacement can achieve faster replenishment with electric energy. At present, there is also a special battery swap system for battery replacement, which is provided with a battery pick-and-place device and a movable battery swap device. The battery pick-and-place device is configured to place a battery on the battery swap device, or take away the battery on the battery swap device and transfer the battery to a charging device for charging. The battery swap device carries the battery, moves between a power consuming device and the battery pick-and-place device, i.e., transfers the battery between the power consuming device and the battery pick-and-place device, and installs the battery to the power consuming device or removes the battery from the power consuming device. When the battery is installed to the power consuming device, a connector of the battery fits with a connector of the power consuming device in a plug-in manner to output electric energy to the power consuming device; and when the battery is being charged, the connector of the battery fits with a connector of the charging device in a plug-in manner to output electric energy to the battery.

Sometimes, a short circuit occurs when the battery is connected to the power consuming device, and there is also a short circuit when the battery is connected to the charging device for charging, resulting in a safety risk. Sometimes, the battery cannot normally output or input electric energy due to poor electric connection with the power consuming device and the charging device. The inventors have found that the above situations are mostly caused by water and dust entering the connector of the battery. The inventors have noticed that the connector of the battery is usually exposed during the transfer process of the battery by the battery swap device and thus prone to dust or water ingress. Dust ingress easily leads to a poor electric connection, water ingress easily leads to a short circuit, and water ingress also makes it easier for dust to adhere to the connector and thus affects the stability of connection, resulting in reduced safety of the battery and reduced electric current transfer stability.

In view of this, the present application provides a battery swap device, comprising a movable base and a protective apparatus. The protective apparatus is provided on the movable base and configured to protect a connector. The protective apparatus comprises a drive mechanism and a covering member. The drive mechanism is configured to drive the covering member to move to cover or uncover the connector. During the battery transfer process, the drive mechanism drives the covering member to cover the connector so as to prevent dust and water from entering the connector. After the transfer, for example, when the battery swap device and the battery reach a battery installation position of a power consuming device, the drive mechanism drives the covering member to leave the battery, so that the connector is exposed again so as to connect the connector of the battery to a current input port of the power consuming device. Thus, in the battery swap device according to the present application, during the transfer process, the covering member automatically protects the connector of the battery under the action of the drive mechanism, so as to effectively solve the problem of water and dust entering the connector, thereby improving the safety of the battery and the electric current transfer stability.

It should be noted that a battery installation position refers to a space formed in the power consuming device for accommodating a battery, e.g., an upward recess formed in a chassis of a vehicle, the recess serves as the battery installation position for accommodating the battery, and the connector of the power consuming device is disposed in the battery installation position.

The battery swap device and the battery swap system disclosed in the embodiments of the present application can be used for, but not limited to, replacing batteries of vehicles, and can also be used for replacing batteries of ships, aircrafts, and other power consuming devices, such as electric toys, electric tools, battery cars, electric vehicles, steamships and spacecrafts. The electric toys may include stationary or mobile toys, for example, game consoles, electric car toys, electric ship toys, electric airplane toys, etc. The electric tools may include a stationary or mobile electric tools, for example, electric machine tools, electric sweeping vehicles, etc. The spacecrafts may include airplanes, rockets, aerospace planes, spaceships, etc.

The battery swap device and the battery swap system are described below, taking the power consuming device being a vehicle as an example.

Referring to FIG. 1, the battery swap system comprises a battery swap device 1000 and a battery pick-and-place device 4000.

The battery swap system further comprises a charging device (not shown in the figure), and the charging device is configured to store a battery 2000 and charge the battery 2000. The battery pick-and-place device 4000 may be a robot, a stacker, etc. The battery pick-and-place device 4000 is provided with a fork 4001 (the fork 4001 may also be replaced with a mechanical arm). Using the fork 4001, an under-charge battery 2000 on the battery swap device 1000 is removed and placed into the charging device for recycling, and a full-charge battery 2000 is taken out from the charging device and placed on the battery swap device 1000.

The battery swap device 1000 moves between the vehicle and the battery pick-and-place device 4000. The battery swap device 1000 removes the under-charge battery 2000 from the vehicle and transfers same to the battery pick-and-place device 4000. The battery pick-and-place device 4000 takes away the under-charge battery 2000 from the battery swap device 1000 and places same into the charging device, and takes out the full-charge battery 2000 from the charging device and places same onto the battery swap device 1000, and then the battery swap device 1000 transfers the full-charge battery 2000 to the vehicle and installs same to the vehicle.

In the case where the power consuming device is a movable device, such as a vehicle, the battery swap system may further comprise a battery swap platform 3000 for parking the vehicle. The battery swap device 1000 moves between the battery swap platform 3000 and the battery pick-and-place device 4000. The battery swap platform 3000 is configured to lift the vehicle as a whole, the vehicle is located above the battery swap platform 3000, an avoidance opening 3001 is formed in the battery swap platform 3000, an installation position (not shown in the figure) of the battery 2000 of the vehicle corresponds to the avoidance opening 3001, the battery swap device 1000 is parked below the avoidance opening 3001 of the vehicle, and the battery 2000 on the battery swap device 1000 passes through the avoidance opening 3001 and is then installed in the installation position of the battery 2000 of the vehicle, or the battery 2000 in the installation position of the battery 2000 of the vehicle is removed, passes through the avoidance opening 3001, and then falls onto the battery swap device 1000.

Figures 2, 3:
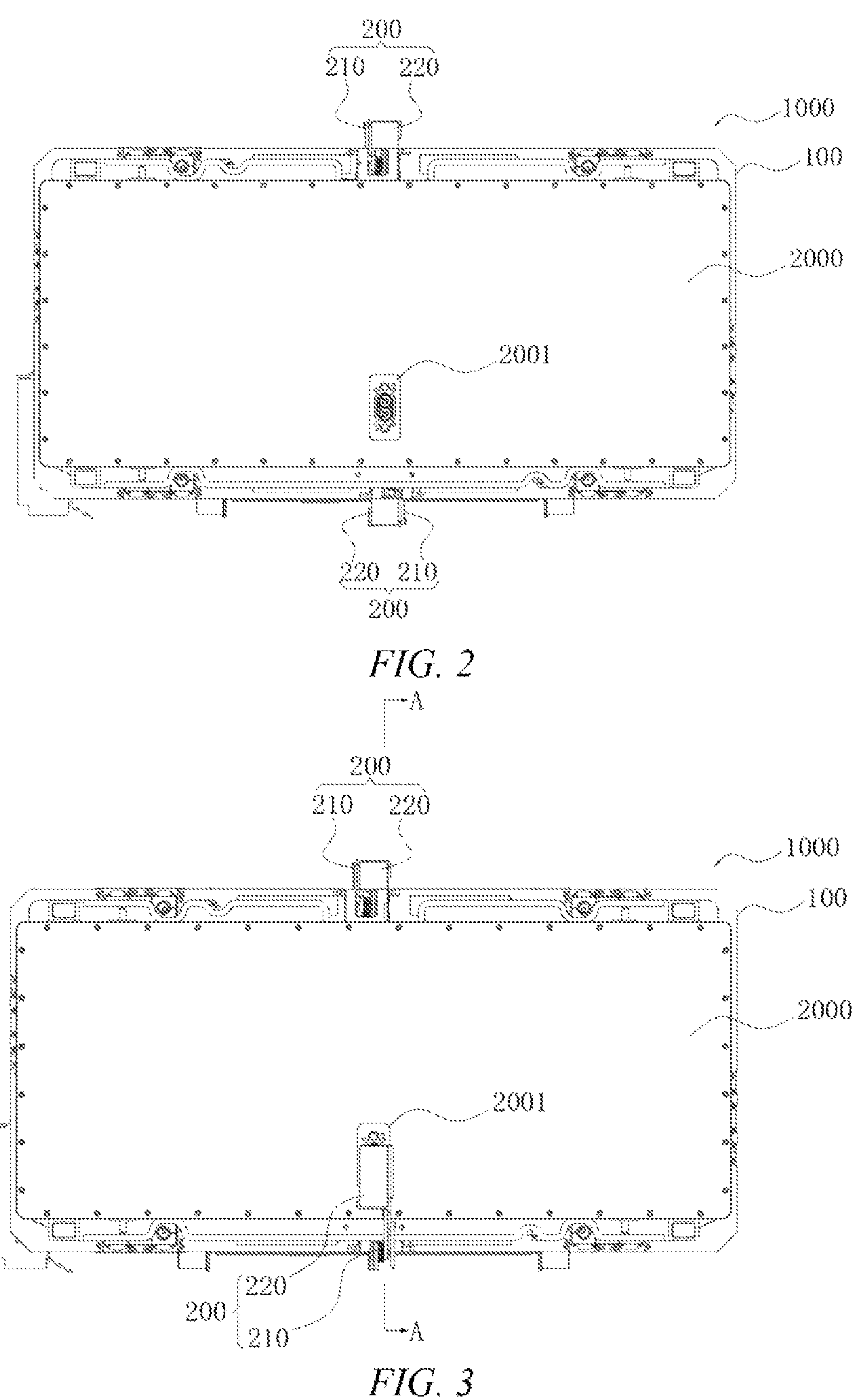
FIG. 2 is a schematic structural diagram of a battery swap device according to an embodiment of the present application.
FIG. 3 is a schematic structural diagram of a battery swap device according to an embodiment of the present application, with a covering member covering a connector of a battery.

As shown in FIG. 2, the battery swap device 1000 comprises a movable base 100 and a protective apparatus 200. The movable base 100 is configured to carry the battery 2000, and the battery 2000 is provided with a connector 2001 configured to transfer electric energy. The protective apparatus 200 is provided on the movable base 100 and configured to protect the connector 2001. The protective apparatus 200 comprises a drive mechanism and a covering member 220. The drive mechanism is configured to drive the covering member 220 to move to cover or uncover the connector 2001.

The movable base 100 is an apparatus configured to move between the battery pick-and-place device 4000 and the vehicle, and is also an apparatus configured to carry the battery 2000 during the transfer process. In other words, the movable base 100 moves between the battery pick-and-place device 4000 and the vehicle to transfer the battery 2000. The movable base 100 may be a trolley driven by a motor. The trolley moves between the battery pick-and-place device 4000 and the vehicle along a set path. A track may be provided between the battery pick-and-place device 4000 and the vehicle to set the path. The trolley is mounted at the track and moves along the track.

When the battery 2000 is located on the movable base 100, the connector 2001 of the battery 2000 usually faces upwards so as to be connected to the connector 2001 in the installation position of the battery 2000 on a chassis of the vehicle.

The protective apparatus 200 is an apparatus for protecting the connector 2001 of the battery 2000, and the protective apparatus 200 is provided on the movable base 100. When the movable base 100 carries the battery 2000 and moves between the battery pick-and-place device 4000 and the vehicle, the protective apparatus 200 protects the connector 2001 of the battery 2000 from external dust, water and other substances.

The covering member 220 is a component of the protective apparatus 200 for covering the connector 2001. The covering member 220 covering the connector 2001 means that the protective apparatus 200 at least shields an upper end surface of the connector 2001 by means of the covering member 220 such that the end of the connector 2001 to be connected to the power consuming device and the charging device is prevented from contacting with water, for example, the covering member 220 can protect the connector 2001 from getting wet on a rainy day, and when there is an opening in the upper end surface of the connector 2001, it is possible to prevent water from entering the interior of the connector 2001 through the opening. The covering member 220 uncovering the connector 2001 means that the covering member 220 moves away from the above of the connector 2001, so that the power consuming device is connected to the charging device by means of the connector 2001.

The drive mechanism is a component for providing power to the covering member 220 so as to enable the covering member 220 to switch between a position where the connector 2001 is covered and a position where the connector 2001 is uncovered.

In the technical solution of the present application, the protective apparatus 200 is provided on the movable base 100, the drive mechanism of the protective apparatus 200 drives the covering member 220 to cover the connector 2001 of the battery 2000, and during the transfer process of the battery 2000 by the movable base 100, the covering member 220 protects the connector 2001 to prevent dust and water from entering the connector 2001. After the battery is transferred in position, the drive mechanism drives the covering member 220 to move away from the connector 2001 to enable the battery 2000 to leave the movable base 100. In the battery swap device 1000 according to the present application, during the transfer process, the covering member 220 automatically protects the connector 2001 of the battery 2000 under the action of the drive mechanism, thereby effectively improving the safety of the battery 2000 and prolonging the service life of the connector 2001.

Figure 4:
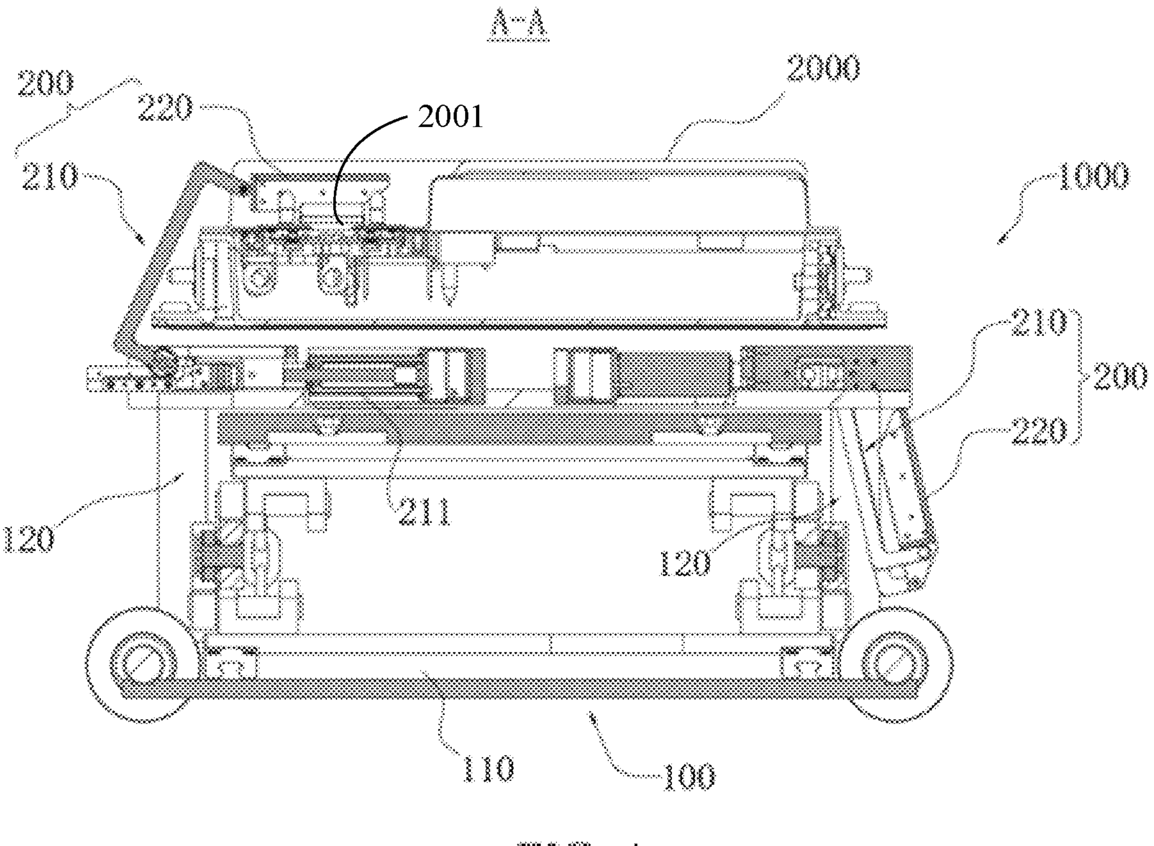
FIG. 4 is a cross-sectional view of FIG. 3 taken along line A-A.

As shown in FIGS. 2, 3 and 4, in an embodiment of the present application, the protective apparatus 200 has an extended state in which the covering member 220 extends out of the movable base 100 to cover the connector 2001, and a retracted state in which the covering member 220 is retracted to the movable base 100.

In other words, the drive mechanism can drive the covering member 220 to extend or retract. After the battery 2000 is placed on the movable base 100, the drive mechanism drives the covering member 220 to extend to cover the connector 2001 of the battery 2000; and after the movable base 100 transfers the battery 2000 in position, the drive mechanism drives the covering member 220 to be retracted to the movable base 100 to provide a space for the battery 2000 to leave the movable base 100.

In the above technical solution, the drive mechanism drives the covering member 220 to leave the connector 2001 of the battery 2000 and drives the covering member 220 to be retracted to the movable base 100, so that the whole battery swap device 1000 takes up a small space.

The number of the protective apparatuses 200 is not limited in the present application. In an embodiment, the movable base 100 is provided with one protective apparatus 200. In another embodiment, the movable base 100 is provided with two protective apparatuses 200, and the two protective apparatuses 200 may be disposed symmetrically about the movable base 100 to respectively protect the two batteries 2000 carried on the movable base 100, or protect the two connectors 2001 of one battery 2000.

As shown in FIG. 4, in an embodiment of the present application, the movable base 100 is provided with an accommodating space 120. In the retracted state, the covering member 220 is at least partially located in the accommodating space 120.

The accommodating space 120 described above is a space within an outer contour of the movable base 100, and the covering member 220 is embedded into the movable base 100 when the movable base 100 is located within the accommodating space 120.

In the above technical solution, when retracted, the covering member 220 is at least partially located in the accommodating space 120, with only part of the covering member exposed or not exposed to an outside of the movable base 100, so that the battery swap device 1000 is of a more compact structure, has reduced space occupied by the battery swap device 1000, and also has a function of protecting the covering member 220 to prevent the covering member 220 from being damaged by interference with foreign objects.

Figures 5, 6:
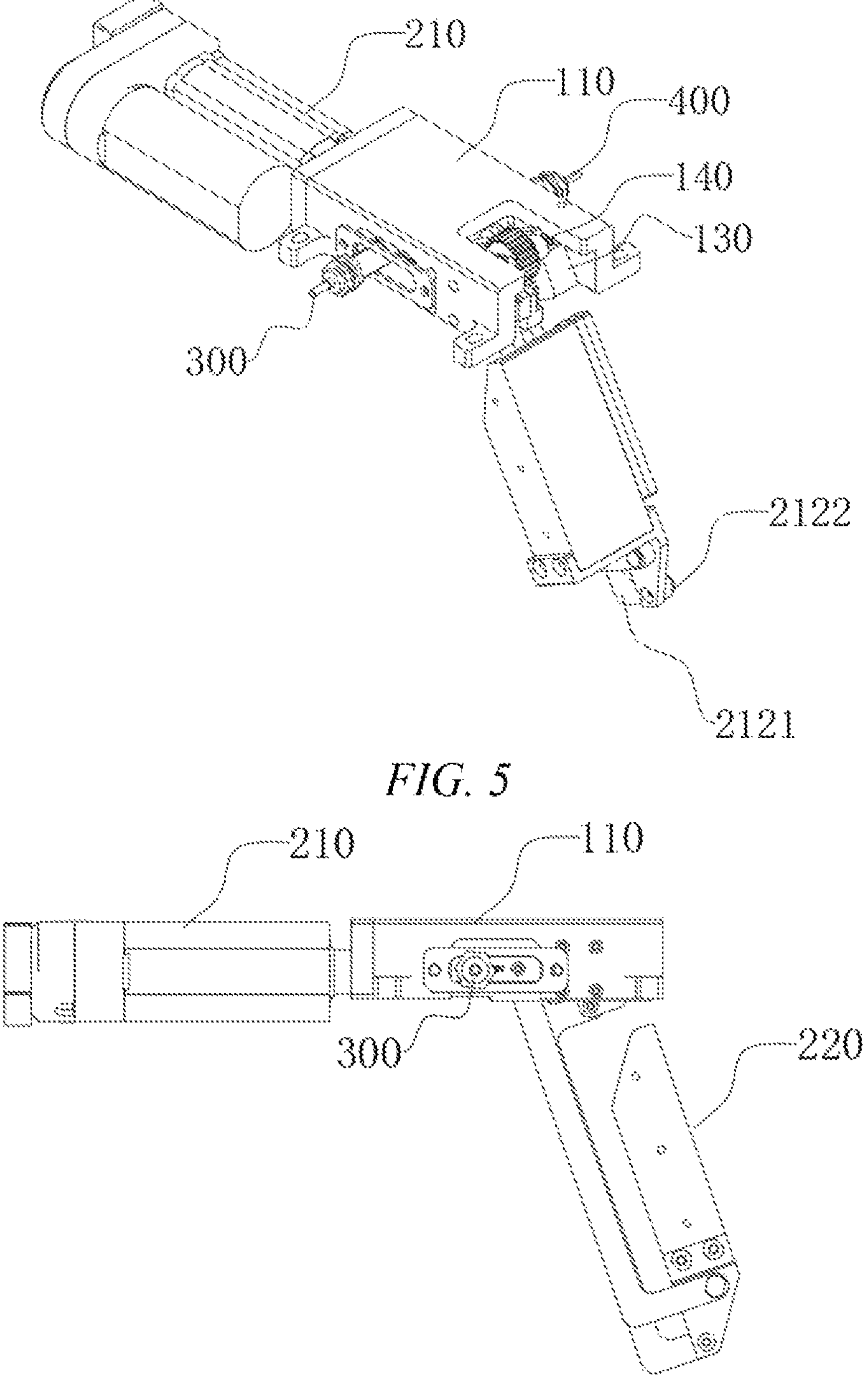
FIG. 5 is a schematic perspective view of a protective apparatus in a retracted state.
FIG. 6 is a schematic front view of the protective apparatus in the retracted state.
Figures 7, 8:
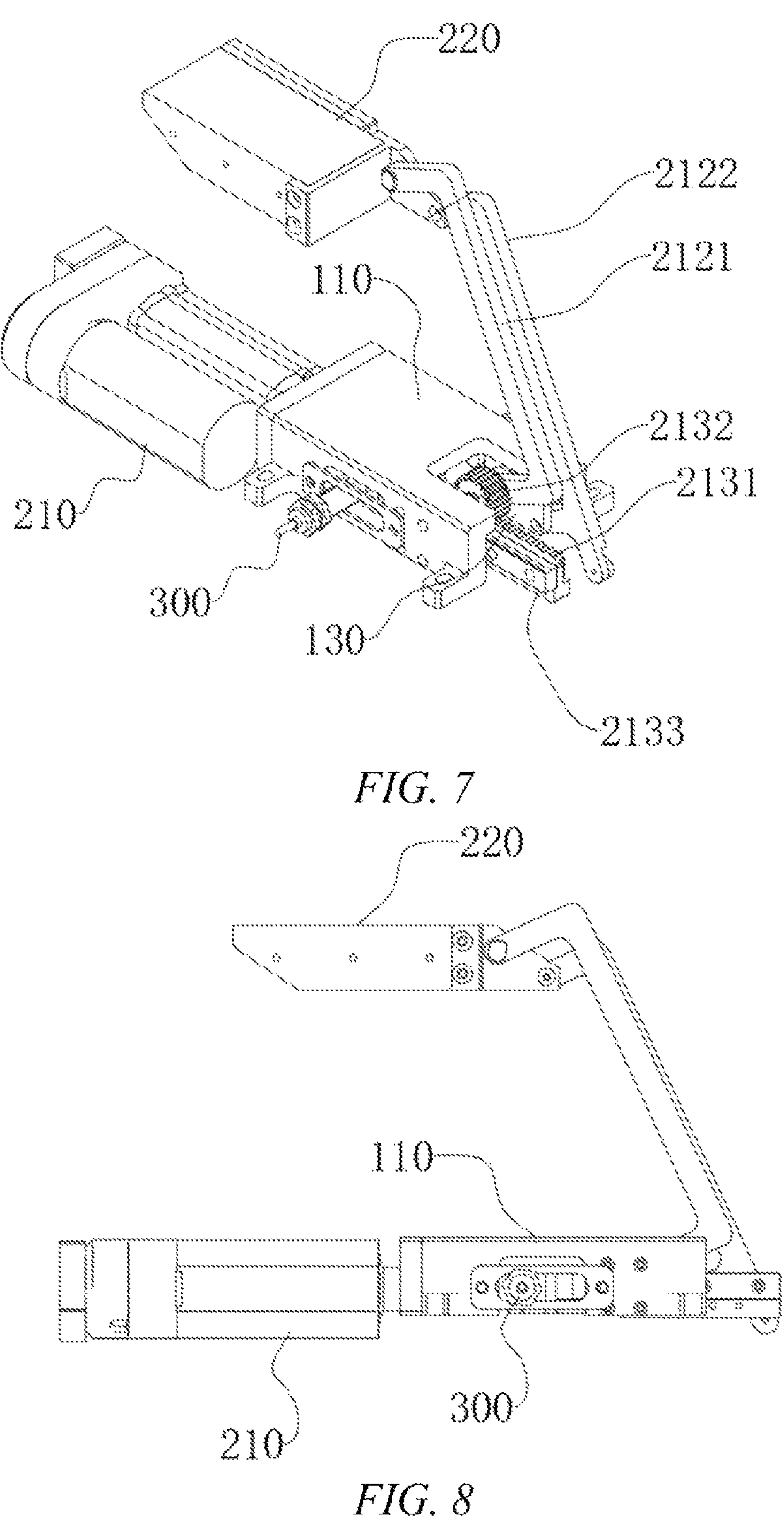
FIG. 7 is a schematic perspective view of the protective apparatus in an extended state.
FIG. 8 is a schematic front view of the protective apparatus in the extended state.

In an embodiment of the present application, as shown in FIGS. 4, 5 and 6, in the extended state, the covering member 220 is located above the movable base 100; and as shown in FIGS. 4, 7 and 8, in the retracted state, the covering member 220 is located on a side surface of the movable base 100.

The movable base 100 generally comprises a top surface, a bottom surface and a side surface. The top surface and the bottom surface are opposite in the direction of gravity, the top surface is configured to place the battery 2000, the bottom surface is provided with walking wheels, and the side surface is located between the top surface and the bottom surface and connects the top surface to the bottom surface. In the retracted state, the covering member 220 is retracted to the side surface of the movable base 100 by means of the drive mechanism. In the extended state, the drive mechanism lifts the covering member 220 above of the battery 2000 and covers the connector 2001 of the battery 2000 from above.

In the above technical solution, the covering member 220 is retracted to the side surface of the movable base 100 and does not occupy the space above the movable base 100, so that when the battery 2000 is placed on the movable base 100, there is no need to consider avoiding the covering member 220. Such a configuration will not affect the pick and place of the battery 2000. In addition, when the battery 2000 is mounted upwards to a power consuming device by the battery swap device 1000, the covering member 220 on the side surface is less likely to interfere with the power consuming device.

In other embodiments, in the retracted state, the covering member 220 may also be located on the top surface or the bottom surface of the movable base 100, which is not limited by the present application.

As shown in FIG. 4, in an embodiment of the present application, one end of the drive mechanism is mounted at the movable base 100, and the covering member 220 is connected to the other end of the drive mechanism.

In the above technical solution, the drive mechanism is similar to a mechanical arm, and the covering member 220 is connected to an output end of the drive mechanism, so that the covering member 220 can be driven by the drive mechanism to move with multiple degrees of freedom so as to cover and uncover the connector 2001.

Figures 9, 10:
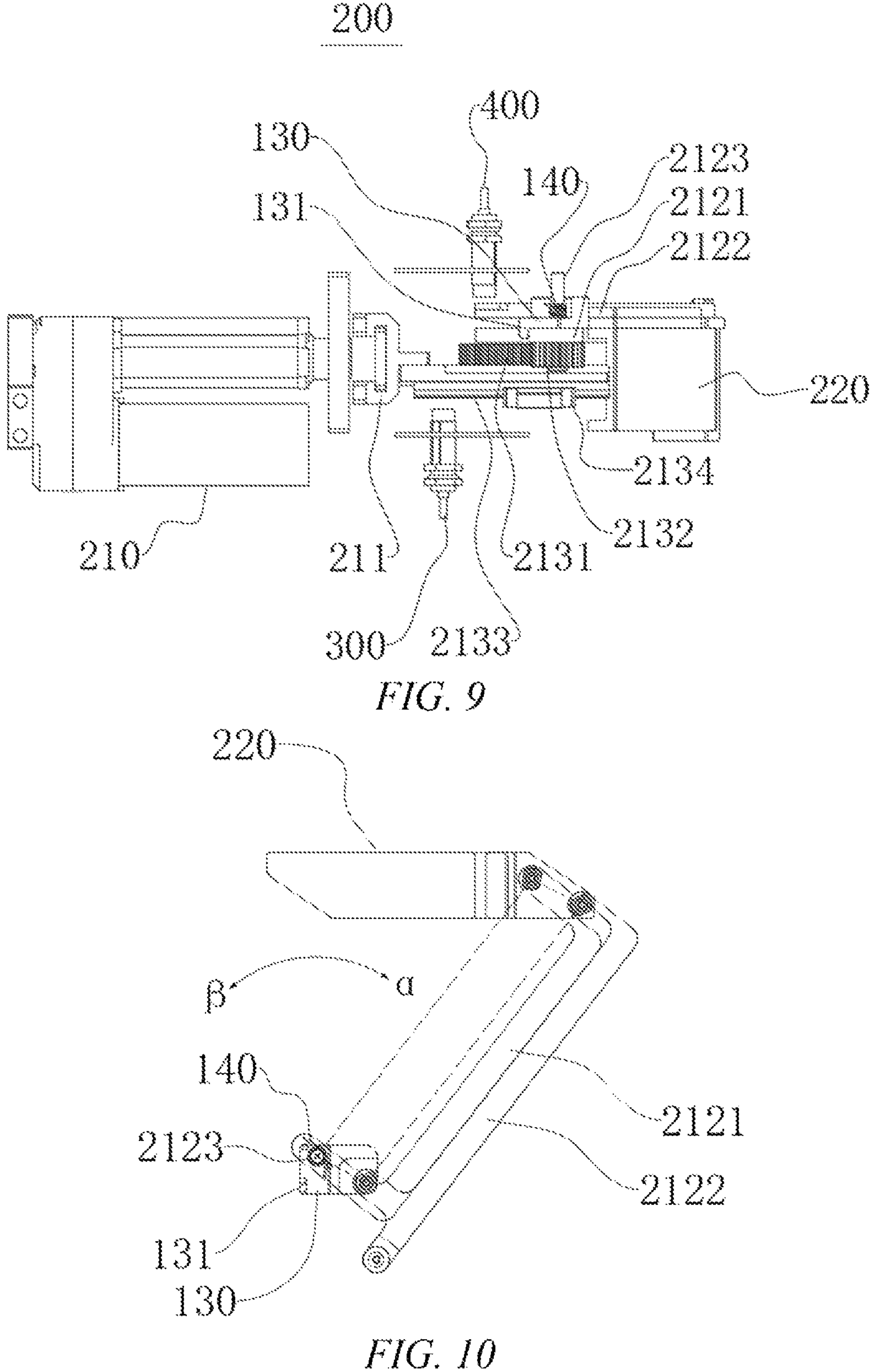
FIG. 9 is a schematic top view of the protective apparatus in the retracted state.
FIG. 10 is a schematic simulated diagram of a first connecting rod and a second connecting rod of the protective apparatus in the extended state.

As shown in FIG. 9, in an embodiment of the present application, the drive mechanism comprises a drive member 210, a first connecting rod 2121 and a second connecting rod 2122. One end of the first connecting rod 2121 and one end of the second connecting rod 2122 are separately hinged to the movable base 100, and the other end of the first connecting rod 2121 and the other end of the second connecting rod 2122 are separately hinged to the covering member 220. The drive member 210 is configured to drive the first connecting rod 2121 to rotate around a hinge point of the first connecting rod 2121 to the movable base 100, i.e., a hinge point at which the first connecting rod 2121 is hinged to the movable base 100.

In the above technical solution, the movable base 100, the first connecting rod 2121, the covering member 220 and the second connecting rod 2122 are sequentially hinged. The first connecting rod 2121 is a driving member, the first connecting rod 2121 drives the covering member 220 and the second connecting rod 2122 to rotate, and the first connecting rod 2121 and the second connecting rod 2122 constrain the covering member 220, so as to guarantee the smooth movement of the covering member 220 and ensure the positional consistency of each covering by the covering member 220 to not interfere with the connector 2001.

Further, in an embodiment of the present application, as shown in FIGS. 4, 7 and 9, the movable base 100 comprises a base body 110, a third connecting rod 130, and an elastic resetting member 140. The third connecting rod 130 and the first connecting rod 2121 are both hinged to the base body 110, and their hinge axes are collinear. One end of the second connecting rod 2122 is hinged to the covering member 220, and the other end of the second connecting rod 2122 is hinged to the third connecting rod 130. The elastic resetting member 140 is configured to maintain the third connecting rod 130 in an initial position.

Figures 11, 12:
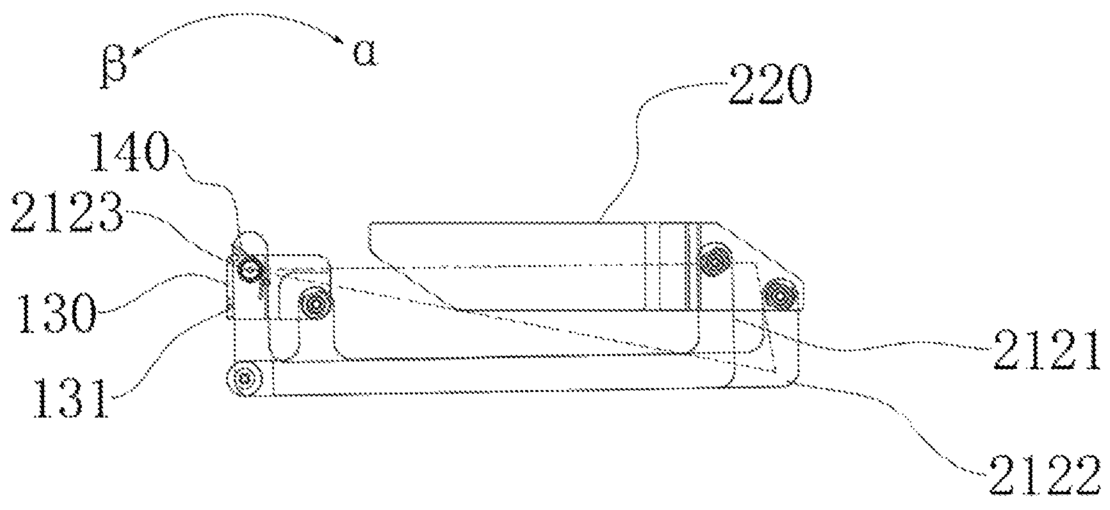
FIG. 11 is a schematic diagram of the protective apparatus when transformed from a parallelogram connecting rod mechanism to a triangular connecting rod mechanism.
FIG. 12 is a schematic simulated diagram of the first connecting rod and the second connecting rod of the protective apparatus in the retracted state.

As shown in FIG. 10, during the movement of the protective apparatus 200 from the extended state to the retracted state, the first connecting rod 2121, the covering member 220, the second connecting rod 2122 and the third connecting rod 130 firstly form a parallelogram connecting rod mechanism, and during clockwise rotation of the first connecting rod 2121, the angle of the covering member 220 remains unchanged, and the covering member 220 only translates but does not rotate. As shown in FIG. 11, the first connecting rod 2121 drives the third connecting rod 130 to rotate clockwise against an elastic force of the elastic resetting member 140 when the first connecting rod 2121 rotates clockwise to abut against the third connecting rod 130, and at this time, the connecting rod mechanism degrades from the parallelogram connecting rod mechanism to a triangular connecting rod mechanism. As shown in FIG. 12, the connecting rod mechanism as a whole follows the third connecting rod 130 to rotate around a hinge axis of the third connecting rod 130 and the base body 110, and the angle of the covering member 220 changes.

In the embodiments of the present application, clockwise refers to a clockwise direction α shown in the figures. During the movement of the protective apparatus 200 from the retracted state to the extended state, the first connecting rod 2121 rotates in a counterclockwise direction β, and the connecting rod mechanism is transformed from the triangular connecting rod mechanism to the parallelogram connecting rod mechanism.

Further, the third connecting rod 130 is provided with a limiting boss 131, and when the first connecting rod 2121 rotates clockwise to abut against the limiting boss 131, the first connecting rod 2121 drives the third connecting rod 130 to rotate clockwise against the elastic force of the elastic resetting member 140, and at this time, the connecting rod mechanism degrades from the parallelogram connecting rod mechanism to the triangular connecting rod mechanism.

Further, the elastic resetting member 140 may be a torsion spring, with one end of the torsion spring abutting against the third connecting rod 130, and the other end abutting against the base body 110, so that the third connecting rod 130 is maintained in an initial position.

In an embodiment of the present application, the drive mechanism further comprises a first rotating shaft 2123, one end of the first connecting rod 2121 being hinged to the movable base 100 by means of the first rotating shaft 2123, and the first rotating shaft 2123 being fixed to the first connecting rod 2121; and the drive mechanism further comprises a gear 2132 and a rack 2131 which mesh with each other, the gear 2132 being fixed to the first rotating shaft 2123, and the drive member 210 being configured to drive the rack 2131 to move to swing the first connecting rod 2121 by means of the gear 2132.

The first rotating shaft 2123 may be fixed to the first connecting rod 2121 by means of welding or integral forming. The gear 2132 may be fixed to the first rotating shaft 2123 by means of interference fitting or integral forming, the rack 2131 meshes with the gear 2132, and when the drive member 210 drives the rack 2131 to move in its extension direction, the rack 2131 drives the gear 2132 to rotate to swing the first connecting rod 2121 so as to move the covering member 220.

In the above technical solution, a linear motion is converted into rotation by means of the gear 2132 and the rack 2131 and then swings the first connecting rod 2121 to drive the covering member 220. The driving can be implemented with an ordinary pneumatic cylinder, electric cylinder, etc., and does not require the use of a high-torque rotary drive member 210, so as to have low requirements on the drive member 210.

Further, the drive mechanism further comprises a connecting member 211, and an output end of the drive member 210 is connected to the rack 2131 by means of the connecting member 211.

In an embodiment of the present application, the drive mechanism further comprises a sliding rail 2133 and a slider 2134 which cooperate with each other, the slider 2134 being fixedly connected to the movable base 100, and the rack 2131 being fixedly connected to the sliding rail 2133.

In the above technical solution, the slider 2134 is fixed to the movable base 100, and the sliding rail 2133 extends in an extension direction of the rack 2131 and forms a sliding fit with the slider 2134, the sliding rail 2133 and the slider 2134 slide relative to each other when the drive member 210 drives the rack 2131 to move, and the sliding rail 2133 and the slider 2134 cooperate for guiding the rack 2131 to move stably, ensuring a drive effect.

Figure 13:
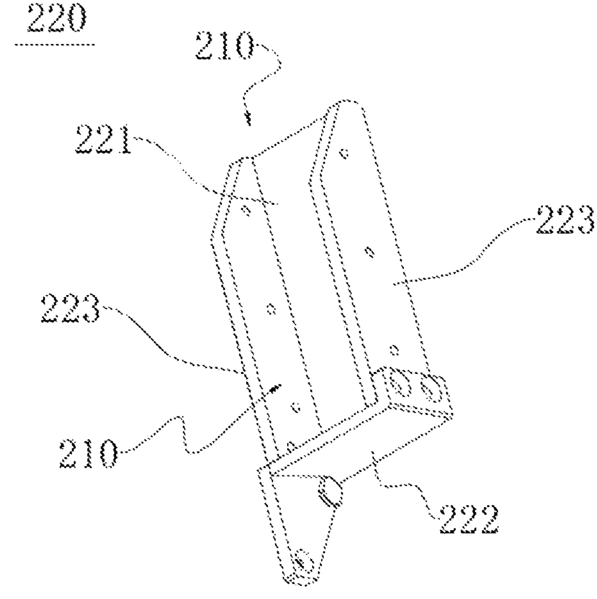
FIG. 13 is a schematic structural diagram of the covering member.

As shown in FIG. 13, in an embodiment of the present application, the covering member 220 is a cover-shaped member configured to cover over the connector 2001.

The cover-shaped member described above refers to a component having an accommodating space 120 and an opening that is in communication with the accommodating space 120. In the above technical solution, the cover-shaped structure shields the connector 2001 in all directions to achieve comprehensive protection and high safety.

In an embodiment of the present application, the covering member 220 comprises a top plate 221, an end plate 222 and two side plates 223, the two side plates 223 being connected to opposite sides of the top plate 221, the end plate 222 being provided at one end of the top plate 221 and connected to the top plate 221 and the two side plates 223, and the side of the covering member 220 opposite the top plate 221 and the side of the covering member opposite the end plate 222 being both open.

In the above technical solution, in addition to a first opening 224 opposite the top plate 221, the cover-shaped structure further has a second opening 225 opposite the end plate 222. When the covering member 220 extends out of the movable base 100 to cover the connector 2001, the side opposite the end plate 222 needs to pass over the connector 2001 to reach the other side of the connector 2001. Providing the opening on this side can prevent interference between the cover-shaped structure and the connector 2001. Since there is no interference, the movement path of the covering member 220 can be set relatively close to the movable base 100, so that the protective apparatus 200 requires a relatively small operating space and can thus conveniently operate in a narrow space under a vehicle.

Figure 14:
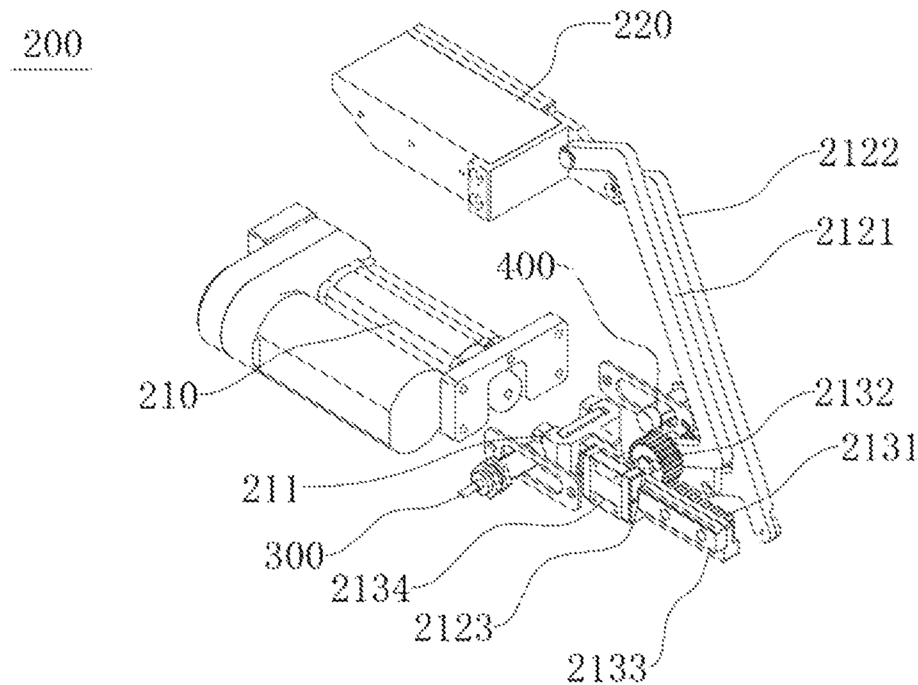
FIG. 14 is a structural exploded view of a first detection unit in a triggered state.
Figure 15:
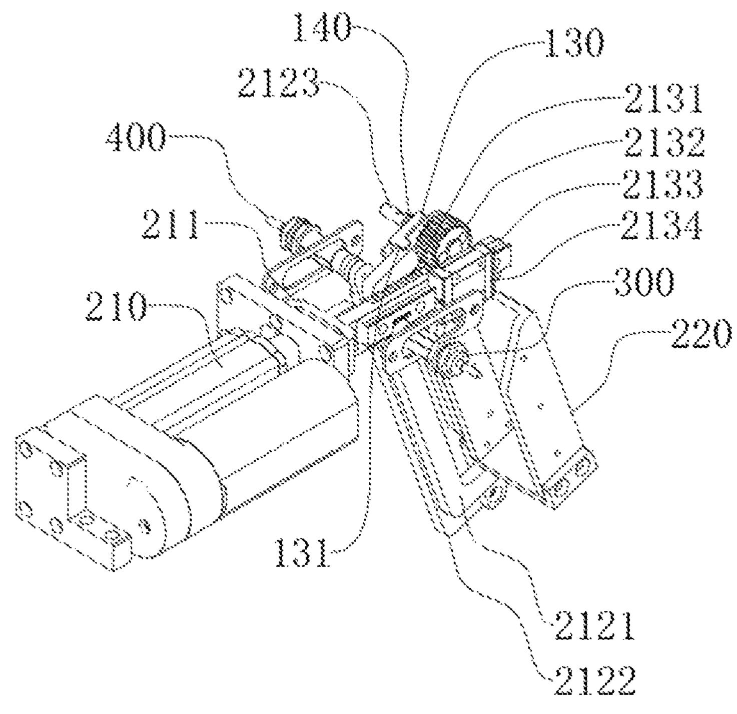
FIG. 15 is a diagram of a second detection unit in a triggered state.

As shown in FIGS. 14 and 15, in an embodiment of the present application, the battery swap device 1000 further comprises: a first detection unit 300 configured to output a first signal when the protective apparatus 200 is detected to be in the extended state; and/or a second detection unit 400 configured to output a second signal when the protective apparatus 200 is detected to be in the retracted state.

As shown in FIG. 14, when the protective apparatus 200 is switched to the extended state, the first detection unit 300 detects that the protective apparatus 200 extends in position and then outputs the first signal to provide, to a control system, a feedback that the covering member 220 covers the connector 2001, and then the transfer of the battery 2000 can be started. As shown in FIG. 15, when the protective apparatus 200 is switched to the retracted state, the second detection unit 400 detects that the protective apparatus 200 is retracted in position and then outputs the second signal to provide, to the control system, a feedback that the covering member 220 is removed from the connector 2001, and then the battery 2000 can be taken away from the movable base 100.

Specifically, the first detection unit 300 and the second detection unit 400 may be in-position sensors, and the first detection unit 300 and the second detection unit 400 are both mounted on the base body 110. The first detection unit 300 is configured to detect the connecting member 211, and the connecting member 211 triggers the first detection unit 300 to output the first signal when the connecting member 211 moves to a position corresponding to the extended state of the protective apparatus 200. The second detection unit 400 is configured to detect the second connecting rod 2122, and the second connecting rod 2122 triggers the second detection unit 400 to output the second signal when the second connecting rod 2122 moves to a position corresponding to the retracted state of the protective apparatus 200.

In the above technical solution, the first detection unit 300 and the second detection unit 400 are provided to obtain state information of the covering member 220, so as to eliminate abnormality in a timely manner to ensure the safety of the battery 2000 during the transfer process.

According to an embodiment of the present application, a battery swap system is further provided, comprising a battery swap platform 3000, a battery pick-and-place device 4000, and a battery swap device 1000 according to the embodiments of the present application.

The battery swap platform 3000 is configured to carry a power consuming device that has a battery 2000 to be replaced. The battery swap device 1000 moves between the battery swap platform 3000 and the battery pick-and-place device 4000 to transfer the battery 2000. The battery pick-and-place device 4000 may be a robot, a stacker, etc. The battery pick-and-place device 4000 is provided with a fork 4001 (the fork 4001 may also be replaced with a mechanical arm). Using the fork 4001, an under-charge battery 2000 on the battery swap device 1000 is removed and placed into the charging device for recycling, and a full-charge battery 2000 is taken out from the charging device and placed on the battery swap device 1000.

According to some embodiments of the present application, referring to FIGS. 2-15, the present application provides a battery swap device 1000. The battery swap device 1000 comprises a movable base 100 and a protective apparatus 200. The protective apparatus 200 is provided on the movable base 100 and configured to protect the connector 2001. The protective apparatus 200 comprises a drive mechanism and a covering member 220. The drive mechanism is configured to drive the covering member 220 to cover or uncover the connector 2001. The drive mechanism comprises a drive member 210, a first rotating shaft 2123, a gear 2132, a rack 2131, a sliding rail 2133, a slider 2134, a first connecting rod 2121 and a second connecting rod 2122. The movable base 100 comprises a base body 110, a third connecting rod 130 and an elastic resetting member 140. One end of the first connecting rod 2121 and one end of the third connecting rod 130 are both hinged to the base body 110 and their hinge axes are collinear, the other end of the first connecting rod 2121 is hinged to the covering member 220, one end of the second connecting rod 2122 is hinged to the covering member 220, and the other end of the second connecting rod 2122 is hinged to the third connecting rod 130. The elastic resetting member 140 is a torsion spring, with one end of the torsion spring abutting against a fourth connecting rod, and the other end abutting against the base body 110, so that the fourth connecting rod is maintained in an initial position. The first rotating shaft 2123 is fixed to the first connecting rod 2121. The gear 2132 is fixed to the first rotating shaft 2123, and the rack 2131 meshes with the gear 2132. The drive member 210 is a pneumatic cylinder, with an output end of the pneumatic cylinder being connected to the rack 2131 by means of the connecting member 211. The slider 2134 is fixedly connected to the base body 110, the rack 2131 is fixedly connected to the sliding rail 2133, and the slider 2134 and the sliding rail 2133 cooperate with each other. the covering member 220 comprises a top plate 221, an end plate 222 and two side plates 223, the two side plates 223 being connected to opposite sides of the top plate 221, the end plate 222 being provided at one end of the top plate 221 and connected to the top plate 221 and the two side plates 223, and the side of the covering member 220 opposite the top plate 221 and the side of the covering member opposite the end plate 222 being both open.

The foregoing descriptions are merely some embodiments of the present application, but are not intended to limit the present application. For those skilled in the art, the present application may have various modifications and variations. Any modifications, equivalent substitutions, improvements, and the like made within the spirit and principle of the present application should fall within the scope of protection of the present application.

What is claimed is:

1. A battery swap device, comprising:

a movable base configured to carry a battery, wherein the battery is provided with a connector configured to transfer electric energy; and a protective apparatus protecting the connector, wherein the protective apparatus is provided on the movable base, the protective apparatus comprises a drive mechanism and a covering member, and the drive mechanism is configured to drive the covering member to move to cover or uncover the connector;

wherein:

the movable base comprises a top surface, a bottom surface, and a side surface, the top surface and the bottom surface are opposite with each other in a direction of gravity, the battery is located on the top surface, the side surface is located between the top surface and the bottom surface, and connects the top surface to the bottom surface;

when the protective apparatus is in an extended state, the covering member extends out of the movable base, is located above the battery, and covers the connector from above, and a projection of the covering member in the direction of gravity is completely within the top surface of the movable base; and when the protective apparatus is in a retracted state, the covering member is located on the side surface of the movable base.

2. The battery swap device according to claim 1, wherein the movable base has an accommodating space, and in the retracted state, the covering member is at least partially located in the accommodating space.

3. The battery swap device according to claim 1, further comprising at least one of:

a first detection unit configured to output a first signal in response to the protective apparatus being detected to be in the extended state; or a second detection unit configured to output a second signal in response to the protective apparatus being detected to be in the retracted state.

4. The battery swap device according to claim 1, wherein one end of the drive mechanism is mounted on the movable base, and the covering member is connected to another end of the drive mechanism.

5. The battery swap device according to claim 1, wherein the drive mechanism comprises a drive member, a first connecting rod, and a second connecting rod, one end of the first connecting rod and one end of the second connecting rod being separately hinged to the movable base, another end of the first connecting rod and another end of the second connecting rod being separately hinged to the covering member, and the drive member being configured to drive the first connecting rod to rotate around a hinge point at which the first connecting rod is hinged to the movable base.

6. The battery swap device according to claim 5, wherein the drive mechanism further comprises:

a rotating shaft, one end of the first connecting rod being hinged to the movable base by through the rotating shaft, and the rotating shaft being fixed to the first connecting rod; and a gear and a rack meshing with each other, the gear being fixed to the rotating shaft, and the drive member being configured to drive the rack to move, such that the rack drives the gear to rotate, and the gear drives the first connecting rod to swing through the rotating shaft.

7. The battery swap device according to claim 6, wherein the drive mechanism further comprises a sliding rail and a slider cooperating with each other, the slider being fixedly connected to the movable base, and the rack being fixedly connected to the sliding rail.

8. The battery swap device according to claim 1, wherein the covering member comprises a top plate, an end plate, and two side plates, the two side plates being connected to opposite sides of the top plate, the end plate being provided at one end of the top plate and connected to the top plate and the two side plates, and a side of the covering member opposite the top plate is opened, and a side of the covering member opposite the end plate is opened.

9. A battery swap system, comprising:

a battery swap platform;

a battery pick-and-place device; and the battery swap device according to claim 1, wherein the battery swap device is configured to move between the battery swap platform and the battery pick-and-place device to transfer a battery.

10. The battery swap device according to claim 1, wherein:

the drive mechanism comprises a drive member, a first connecting rod, a second connecting rod, and a third connecting rod, both one end of the first connecting rod and one end of the third connecting rod are hinged to a base body of the movable base with collinear hinge axes, another end of the first connecting rod is hinged to the covering member, one end of the second connecting rod is hinged to the covering member, and another end of the second connecting rod is hinged to the third connecting rod; and when the protective apparatus moves between the extended state and the retracted state, the first connecting rod, the covering member, the second connecting rod and the third connecting rod are transformed between a parallelogram connecting rod mechanism and a triangular connecting rod mechanism.

11. A battery swap device, comprising:

a movable base configured to carry a battery, wherein the battery is provided with a connector configured to transfer electric energy; and a protective apparatus protecting the connector, wherein the protective apparatus is provided on the movable base, the protective apparatus comprises a drive mechanism and a covering member, and the drive mechanism is configured to drive the covering member to move to cover or uncover the connector;

wherein:

the protective apparatus has an extended state in which the covering member extends out of the movable base to cover the connector, and a retracted state in which the covering member is retracted to the movable base;

the drive mechanism comprises a drive member, a first connecting rod, a second connecting rod, and a third connecting rod, both one end of the first connecting rod and one end of the third connecting rod are hinged to a base body of the movable base with collinear hinge axes, another end of the first connecting rod is hinged to the covering member, one end of the second connecting rod is hinged to the covering member, and another end of the second connecting rod is hinged to the third connecting rod; and when the protective apparatus moves between the extended state and the retracted state, the first connecting rod, the covering member, the second connecting rod and the third connecting rod are transformed between a parallelogram connecting rod mechanism and a triangular connecting rod mechanism.

* * * * *